US008550361B2

(12) United States Patent
Skowronek

(10) Patent No.: US 8,550,361 B2
(45) Date of Patent: Oct. 8, 2013

(54) SYSTEMS, METHODS, AND APPARATUS TO FACILITATE LOCATING A USER OF A TRANSACTION DEVICE

(75) Inventor: Daniel P Skowronek, Parker, CO (US)

(73) Assignee: First Data Corporation, Greenwood Village, CO (US)

( * ) Notice: Subject to any disclaimer, the term of this patent is extended or adjusted under 35 U.S.C. 154(b) by 581 days.

(21) Appl. No.: 12/259,364

(22) Filed: Oct. 28, 2008

(65) Prior Publication Data
US 2010/0102122 A1 Apr. 29, 2010

(51) Int. Cl.
G06K 19/06 (2006.01)
(52) U.S. Cl.
USPC ........ 235/492; 235/380; 235/382.5; 235/451; 235/487
(58) Field of Classification Search
USPC .............. 235/375, 380, 382, 382.5, 451, 487, 235/492, 383, 449; 705/16, 44, 64, 5
See application file for complete search history.

(56) References Cited

U.S. PATENT DOCUMENTS

| 5,777,305 | A | 7/1998 | Smith |
| 6,045,043 | A | 4/2000 | Bashan |
| 6,161,762 | A | 12/2000 | Bashan |
| 6,505,772 | B1 | 1/2003 | Mollett |
| 6,719,206 | B1 | 4/2004 | Bashan |
| 6,994,762 | B2 | 2/2006 | Clingman |
| 7,042,357 | B2 | 5/2006 | Girvin |
| 7,093,767 | B2 | 8/2006 | Faenza, Jr. |
| 7,119,690 | B2 | 10/2006 | Lerch |
| 7,124,937 | B2 | 10/2006 | Myers |
| 7,168,626 | B2 | 1/2007 | Lerch |
| 7,243,840 | B2 | 7/2007 | Bason et al. |
| 7,264,172 | B2 | 9/2007 | Amiot |
| 7,283,054 | B2 | 10/2007 | Girvin |
| 7,303,120 | B2 | 12/2007 | Beenau |
| 7,323,998 | B2 | 1/2008 | Girvin |
| 7,360,689 | B2 | 4/2008 | Beenau et al. |
| D571,346 | S | 6/2008 | Knoll et al. |
| 7,832,636 | B2 * | 11/2010 | Heffez et al. ................. 235/382 |
| 7,857,212 | B1 * | 12/2010 | Matthews .................... 235/380 |

(Continued)

FOREIGN PATENT DOCUMENTS

GB 2 396 530 12/2002
JP 2002373324 12/2002

(Continued)

OTHER PUBLICATIONS

RFID Payments: A Technologies and Process Overview, Tower Group Research Notes, Mar. 2002, pp. 1-12.

Primary Examiner — Tuyen K Vo
(74) Attorney, Agent, or Firm — Sutherland Asbill & Brennan LLP

(57) ABSTRACT

Embodiments of the invention may relate to systems, methods, and apparatus to facilitate locating a user of a transaction device. In one embodiment, a contactless transaction device for facilitating locating the user can be provided. The contactless transaction device may include an antenna operable to electromagnetically receive and transmit data. The contactless transaction device may also include a microchip comprising a memory operable to store consumer account data and location alert data and in communication with the antenna, wherein the microchip is operable to transmit the location alert data to a transaction terminal via the antenna when the contactless transaction device is presented to facilitate a transaction with the transaction terminal.

24 Claims, 6 Drawing Sheets

(56) References Cited

U.S. PATENT DOCUMENTS

| | | |
|---|---|---|
| 2004/0077372 A1 | 4/2004 | Halpern |
| 2004/0185830 A1* | 9/2004 | Joao et al. .................... 455/410 |
| 2005/0024849 A1 | 2/2005 | Parker |
| 2005/0242176 A1 | 11/2005 | Roberge |
| 2005/0242177 A1 | 11/2005 | Roberge |
| 2006/0018450 A1* | 1/2006 | Sandberg-Diment ...... 379/93.12 |
| 2006/0041504 A1* | 2/2006 | Howard et al. ................. 705/38 |
| 2006/0074698 A1 | 4/2006 | Bishop |
| 2006/0196929 A1 | 9/2006 | Kelley et al. |
| 2006/0237531 A1* | 10/2006 | Heffez et al. ................. 235/382 |
| 2007/0055785 A1* | 3/2007 | Stevens ........................ 709/229 |
| 2007/0057039 A1* | 3/2007 | Carlson et al. ................ 235/380 |
| 2007/0075131 A1* | 4/2007 | Alberth et al. ................ 235/380 |
| 2007/0156436 A1 | 7/2007 | Fisher |
| 2007/0170243 A1 | 7/2007 | DeSang |
| 2007/0244633 A1* | 10/2007 | Phillips et al. ................. 701/207 |
| 2007/0267503 A1 | 11/2007 | Dewan |
| 2008/0008359 A1 | 1/2008 | Beenau et al. |
| 2008/0017704 A1 | 1/2008 | VanDeburg |
| 2008/0051059 A1 | 2/2008 | Fisher |
| 2008/0051122 A1 | 2/2008 | Fisher |
| 2008/0052192 A1 | 2/2008 | Fisher |
| 2008/0052233 A1 | 2/2008 | Fisher |
| 2009/0183008 A1 | 7/2009 | Jobmann |

FOREIGN PATENT DOCUMENTS

| | | |
|---|---|---|
| JP | 2003122911 | 4/2003 |
| WO | 0249322 | 6/2002 |
| WO | 2004006064 | 1/2004 |
| WO | 2004006162 | 1/2004 |

* cited by examiner

SYSTEMS, METHODS, AND APPARATUS TO FACILITATE LOCATING A USER OF A TRANSACTION DEVICE

FIELD OF THE INVENTION

Embodiments of the invention relate generally to transaction devices, and more particularly, to systems, methods, and apparatus to facilitate locating a user of a transaction device.

BACKGROUND OF THE INVENTION

A wide variety of conventional cashless transactions are completed utilizing various transaction devices, such as payment instruments associated with a consumer, such as credit cards, debit cards, stored value cards, gift cards, etc. Typically, transaction devices may have a singular purpose, such as providing a credit, debit, or stored value account. Though, in some instances, transaction devices may serve dual purposes, such as serving as a payment instrument and also serving to accrue, track, and redeem loyalty incentives. In certain instances, some transaction devices may occasionally store more than payment or financial account information.

Various conventional monitoring systems for locating and monitoring persons are used. Such systems are employed for a wide range of applications in a variety of fields, including the medical field to monitor patients with dementia or other disabilities or instabilities, to monitor elderly persons, to monitor children or teens, and by security or law enforcement to monitor suspicious or certain persons. Conventional monitoring systems include tags that communicate wirelessly with local monitoring stations, with global positioning satellite systems, or through cellular triangulation techniques to determine an individual's location. However, using these conventional monitoring techniques may be disadvantageous because they shame or embarrass the users, cause unnecessary suspicion by others, are uncomfortable, or are unreliable, among other reasons.

Therefore, a need exists for systems, methods, and apparatus to facilitate locating a user of a transaction device. A further need exists for systems, methods, and apparatus to facilitate locating a user of a contactless transaction device.

SUMMARY OF THE INVENTION

Some or all of the above needs and/or problems may be addressed by certain embodiments of the invention. Embodiments of the invention may relate to systems, methods, and apparatus to facilitate locating a user of a transaction device. In one embodiment, a contactless transaction device for facilitating locating the user can be provided. The contactless transaction device may include an antenna operable to electromagnetically receive and transmit data. The contactless transaction device may also include a microchip comprising a memory operable to store consumer account data and location alert data and in communication with the antenna. The microchip may be operable to transmit the location alert data to a transaction terminal via the antenna when the contactless transaction device is presented to facilitate a transaction with the transaction terminal.

In another embodiment, a method for locating a transaction device user can be provided. The method may include requesting consumer account data from a transaction device when the transaction device is presented to facilitate a transaction with the transaction terminal, wherein the transaction device is operable to store consumer account data and location alert data. The method may further include receiving the location alert data at the transaction terminal from the transaction device, and generating a user location alert responsive to receiving to location alert data.

In yet another embodiment, a system for locating a transaction device user can be provided. The system may include a memory having instructions and a processor in communication with the memory. The processor may be operable to execute the instructions to receive a user location alert from a transaction terminal, wherein the user location alert is generated responsive to receiving location alert data from a transaction device when the transaction device is presented to facilitate a transaction with the transaction terminal. The processor may be operable to execute the instructions to generate an alert indicating the location of the user of the transaction device, and to transmit the alert to at least one of a guardian of the transaction device user, a medical provider, a service provider, the transaction terminal, or an entity associated with the transaction terminal.

Additional systems, methods, apparatus, features, and aspects are realized through the techniques of various embodiments of the invention. Other embodiments and aspects of the invention are described in detail herein and are considered a part of the claimed invention. Other features can be understood and will become apparent with reference to the description and to the drawings.

BRIEF DESCRIPTION OF THE DRAWINGS

Figure 1:
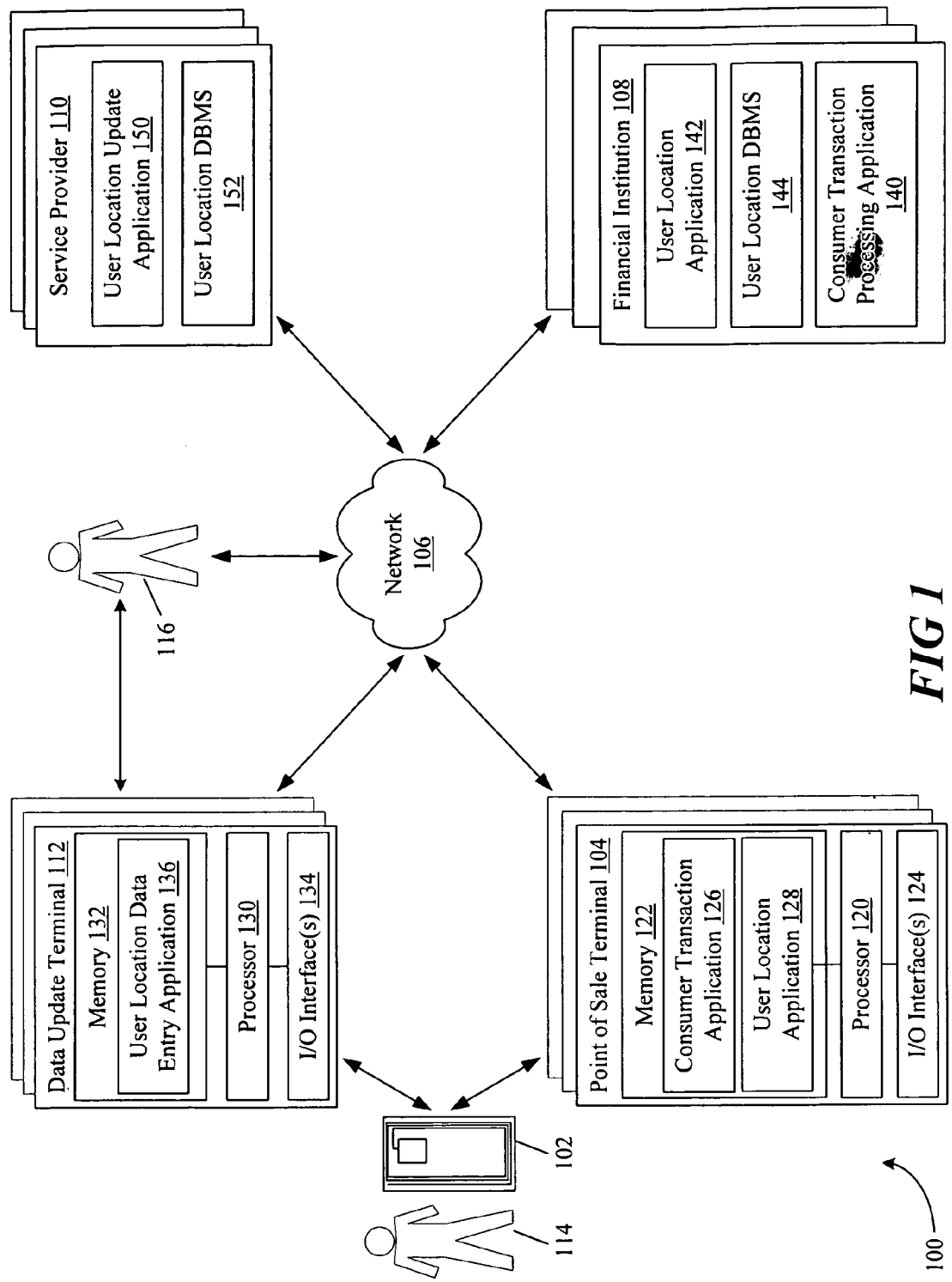
Figure 2:
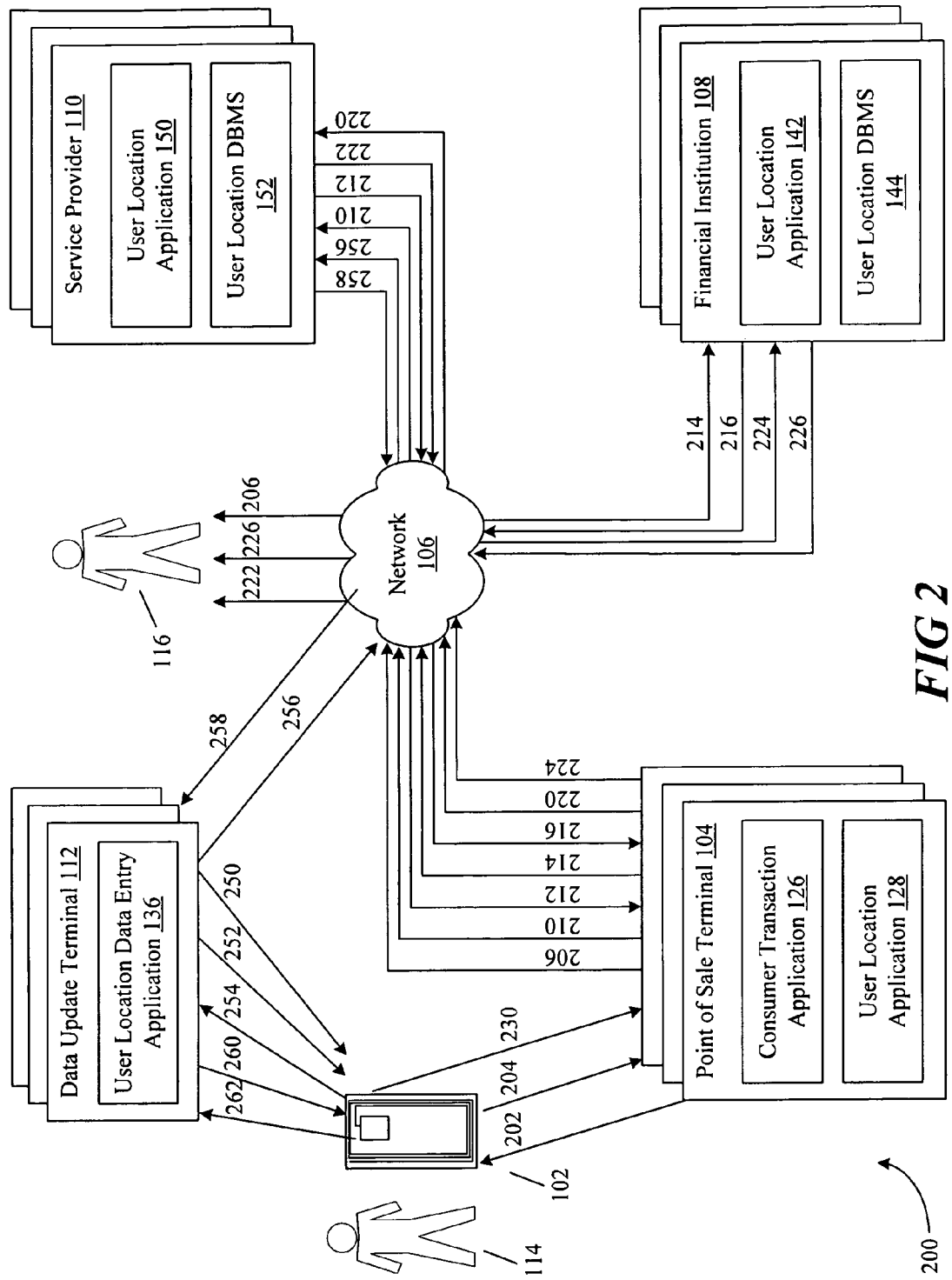
Figure 3:
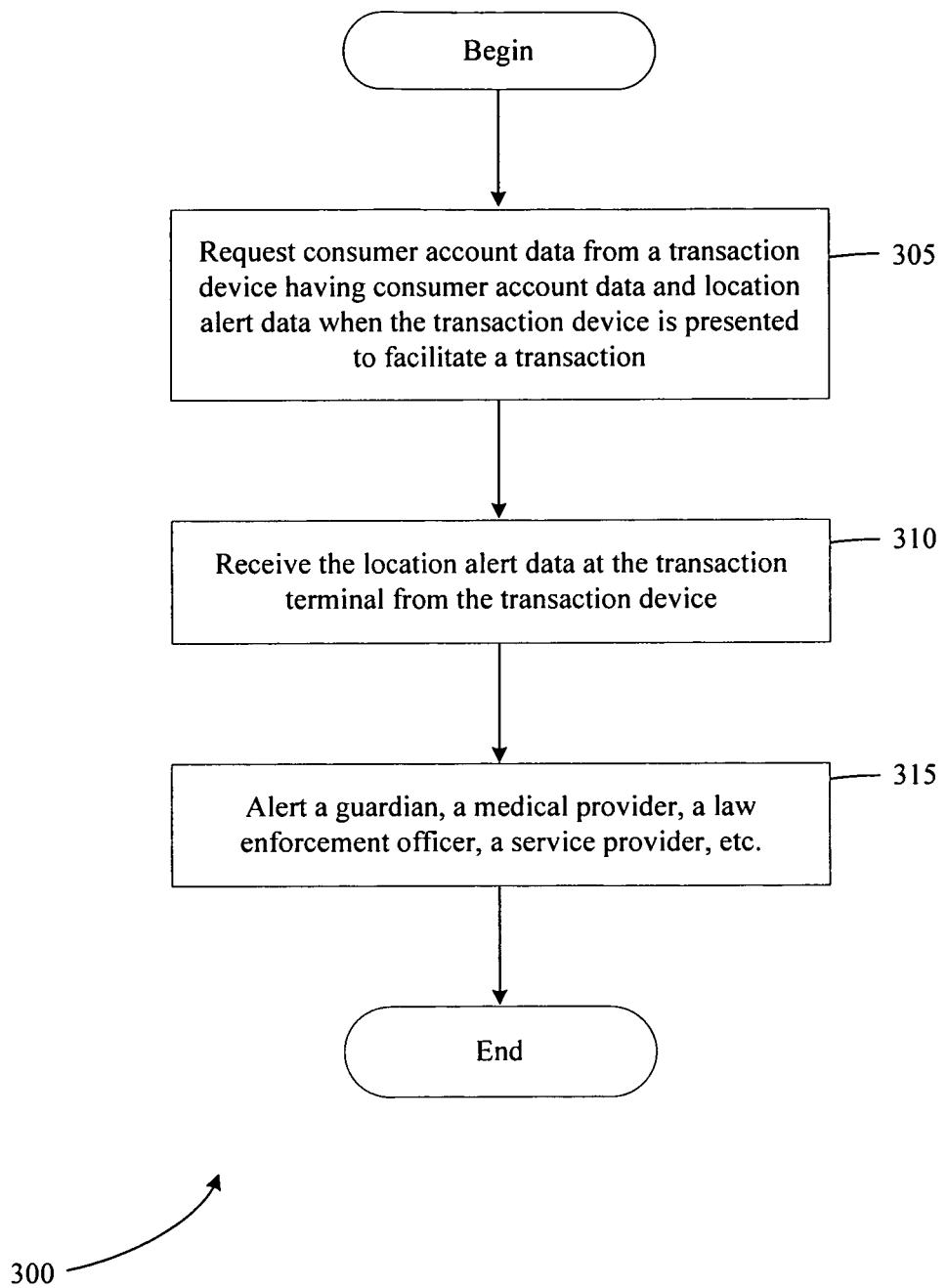
Figure 4:
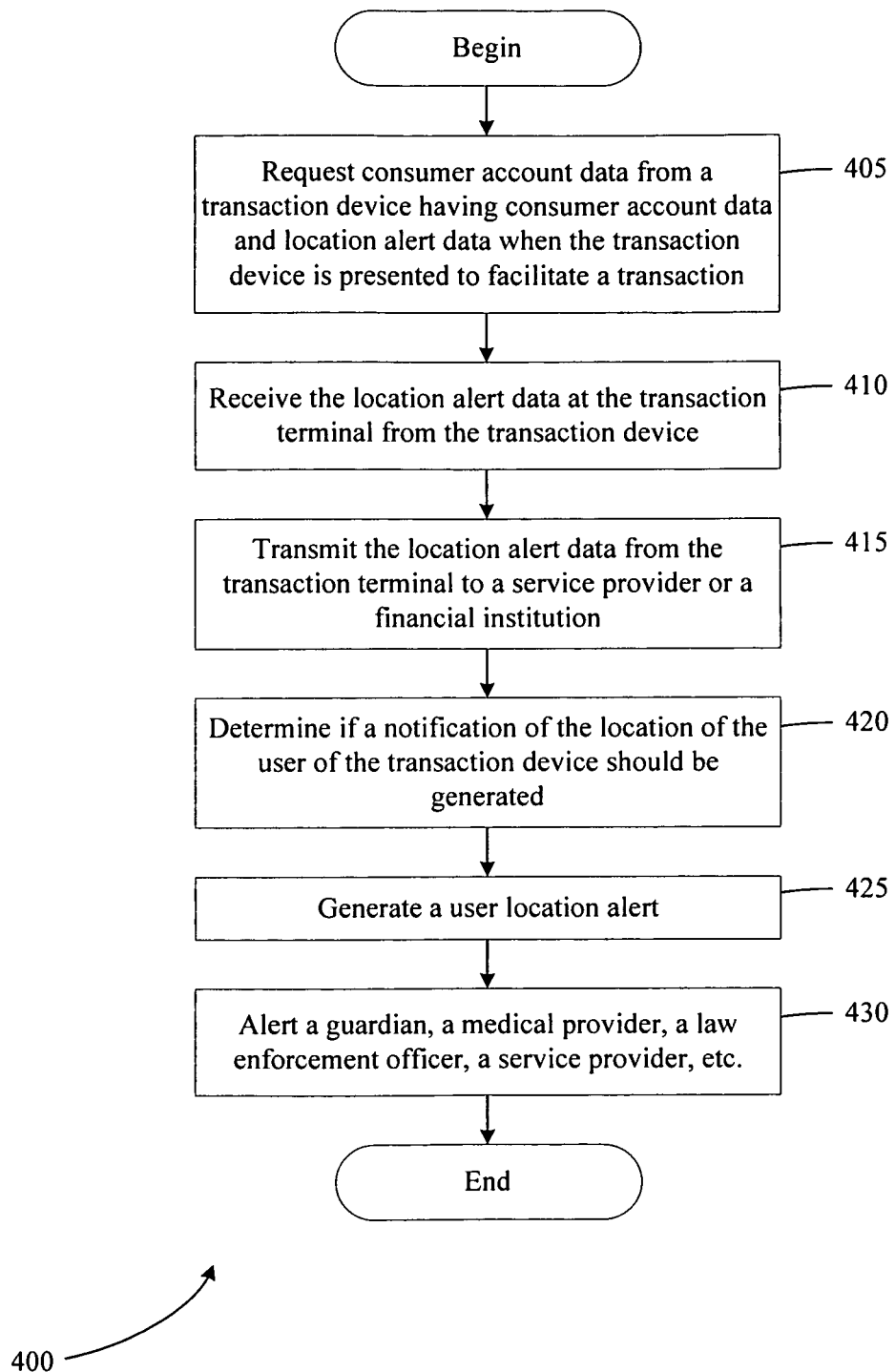
Figure 5:
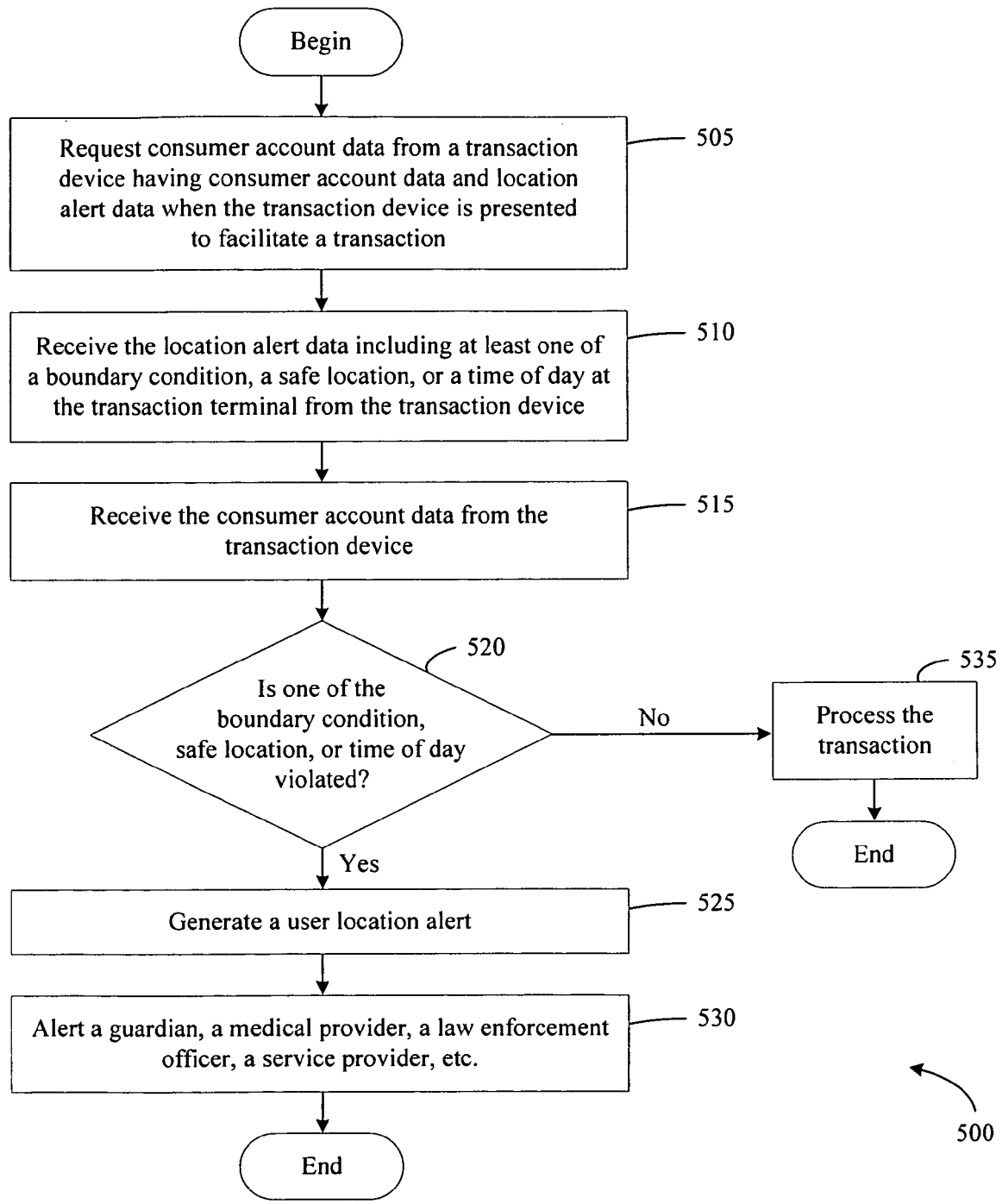
Figure 6:
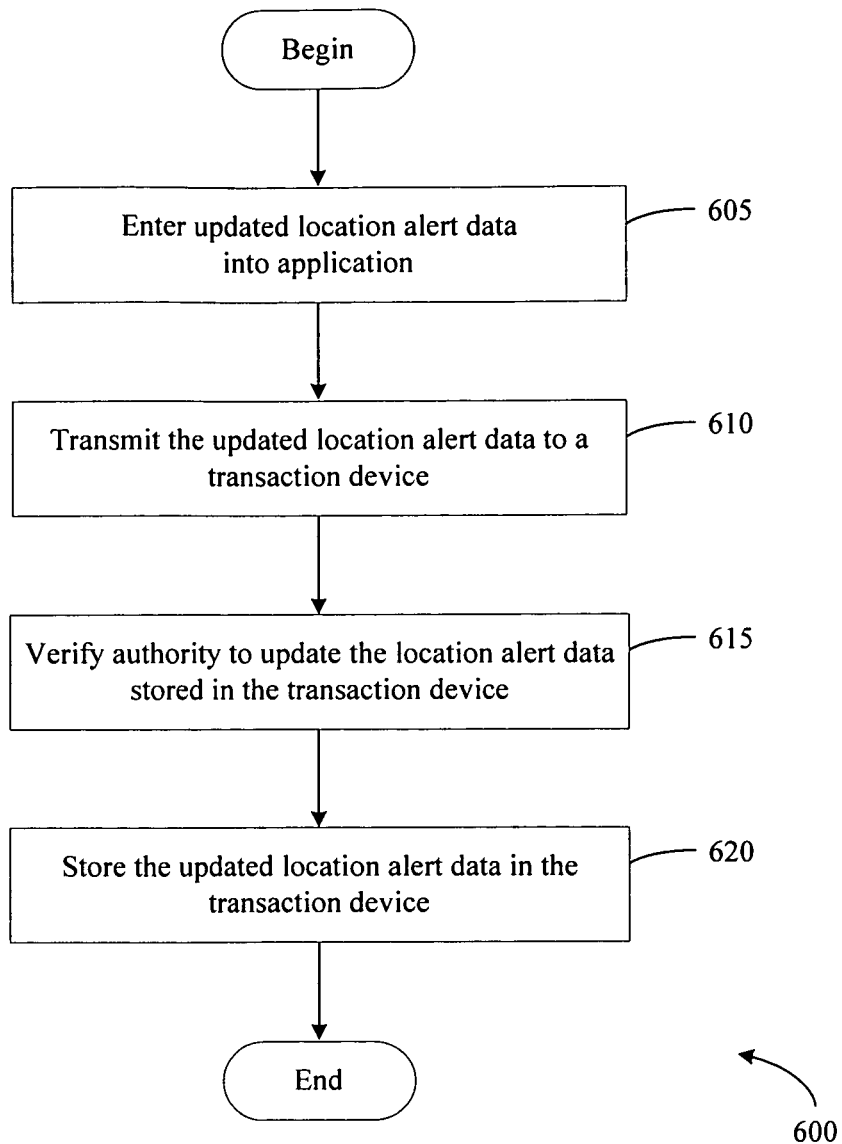

Having thus described the invention in general terms, reference will now be made to the accompanying drawings, which are not necessarily drawn to scale, and wherein:

FIG. 1 illustrates an example functional block diagram of an example system, according to one embodiment of the invention;

FIG. 2 illustrates an example data flow of an example system and method, according to one embodiment of the invention;

FIG. 3 illustrates an example flowchart of an example method, according to one embodiment of the invention;

FIG. 4 illustrates an example flowchart of an example method, according to one embodiment of the invention;

FIG. 5 illustrates an example flowchart of an example method, according to one embodiment of the invention; and FIG. 6 illustrates an example flowchart of an example method, according to one embodiment of the invention.

DETAILED DESCRIPTION OF EMBODIMENTS OF THE INVENTION

Example embodiments of the invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the term "contactless transaction device" refers to any suitable or appropriate device that may be used to store, receive, and transmit medical information, consumer account information, and the like, wirelessly to a requester. For example, a contactless transaction device may be, but is not limited to, a radio frequency identification device ("RFID"), a cellular-based communication device, a Bluetooth enabled device, a Wi-Fi enabled device, an infrared device, and the like, operable to facilitate a consumer transaction, such as a credit transaction, a debit transaction, a stored value transaction, an account inquiry transaction, a loyalty transaction, a medical information transaction, authentication request, verification request, data transmission, data update, and the like. An example contactless transaction device may be configured as a card, a sticker, a key fob, a wristband, or as any other wearable article. Many of the embodiments described herein refer to contactless transaction devices for simplicity; however, other embodiments may use other forms of transaction devices that may not be contactless, such as transaction devices having data stored in a magnetic strip and/or coded on a bar code. Accordingly, where a contactless transaction device is described, any other transaction device operable to store data or have data associated therewith may be used.

As used herein, the terms "transaction terminal," "contactless transaction terminal," and "terminal" may be used interchangeably, and each may refer to any suitable terminal for transacting with a contactless transaction device (and other transaction devices). For example, a transaction terminal may include, but is not limited to, a point of sale ("POS") terminal at a retailer or merchant, a handheld terminal, a personal computer, a mobile computer, a handheld portable computer, a digital assistant, a personal digital assistant, a cellular phone, a mobile phone, a smart phone, a pager, a digital tablet, a desktop computer, a laptop computer, an Internet appliance, or any other processor-based device, and the like.

As used herein, the term "transaction request" refers to any request made by a transaction terminal, for example a point of sale terminal, of a contactless transaction device during any type of transaction. For example, the transaction request may be made during a transaction such as, but not limited to, a consumer transaction, for instance, a credit transaction, a debit transaction, a stored value transaction, an account inquiry transaction, a loyalty transaction, a medical information transaction, authentication request, verification request, data transmission, data update, and the like.

As used herein, the term "requester" refers to any entity, system, device, person, and the like, requesting or attempting to request information from a contactless transaction device. For example, a requestor may be, but is not limited to, a transaction terminal, an individual operating the transaction terminal, an individual on whose behalf the transaction terminal is operated, or an entity owning, hosting, controlling, or otherwise associated with the transaction terminal.

As used herein, the term "transmitter" refers to any entity, system, device, person, and the like, transmitting or attempting to transmit information to a contactless transaction device. For example, a transmitter may be, but is not limited to, a transaction terminal, an individual operating the transaction terminal, an individual on whose behalf the transaction terminal is operated or an entity owning, hosting, controlling, or otherwise associated with the transaction terminal.

In accordance with example embodiments of the invention, systems, methods, and apparatus to facilitate locating a user of a transaction device are provided. According to one embodiment, a transaction device may be operable to store or otherwise associate therewith consumer account data and location alert data. A contactless transaction device may be a payment device, such as a RFID stored value card, RFID credit card, RFID debit card, RFID loyalty card, and the like, operable to facilitate typical consumer transactions with a retailer or merchant, for example. In other embodiments, transaction devices may not be contactless, such as transaction devices having data stored in a magnetic strip and/or coded on a bar code.

The transaction device may be one that is used by device users that may be have a need to be monitored or are otherwise prone to wandering, such as elderly persons, persons suffering from dementia, mental instabilities, mental disabilities, physical disabilities, and the like, and/or convicted criminals subject to geographical boundary constraints, such as a condition of parole or probation. A transaction device used to generate a user location alert is operable to store or otherwise associate therewith location alert data that may include information such as contact information, rules, and/or conditions that may be provided for generating one or more alerts identifying the location of the device user when conducting a transaction. An alert may be transmitted to a guardian, a medical provider, a law enforcement officer, or a service provider, for example, to notify them of the location of transaction approximately when the transaction is conducted, thus notifying them of the location of the device user.

Location alert data stored on or associated with a transaction device may include, but is not limited to, cardholder information, cardholder contact information, guardian contact information, cardholder boundary information, time of day information, safe location information, an absolute alert, medical provider information, law enforcement officer, or service provider information.

As used herein, the term "cardholder" may refer to the primary cardholder or any other additional cardholders or card users. Also, the term "cardholder" is not intended to be limited to holders or users of a transaction device embodying an actual card, such as a stored value card, credit card, debit card, or loyalty card, but may refer to users of any transaction devices as further described herein. Cardholder information may include name, address, telephone number(s), email address(es), age, description, and the like. Cardholder contact information may also include address information, telephone number information, email address information, as well as contact means and/or time information.

As used herein, the term "guardian contact information" may refer to contact information for any person or entity that is designated to contact to notify of the device user's location. A guardian may include, but is not limited to, a legal guardian, a relative, an employer, a caretaker, a law enforcement officer, a probations officer, a medical provider, a service provider, a person or entity with an interest in another person or entity, and the like.

Boundary information may include information designating geographical limitations placed on the cardholder, which, if violated, may cause an alert to be generated. For example, the boundary information may include geographical areas, such as zip codes, area codes, address boundaries, neighborhoods, cities, counties, regions, areas, states, countries, continents, latitude and longitudinal coordinates, and the like.

Similar to boundary information, safe location information may include the information identifying locations, such as retailer or merchant names, at which if the transaction device is used an alert may not be generated because the location has been pre-designated as indicating an acceptable location for card use. For example, acceptable merchants or retailers that the cardholder typically visits may be stored as location alert data to prevent an overabundance of false positive or unnecessary user location alerts to be generated. In another embodiment, the safe location information may expressly indicate locations at which an alert would be generated if the transaction device is used because the location has been pre-designated as indicating a forbidden or otherwise alarming location for the user. Expressly identifying those locations that would generate an alert may be useful if the device user has a tendency to wander to certain locations repeatedly, if certain locations are less safe than others, or if certain locations are being monitored or forbidden for criminal users.

Time of day information may include information designating times of day during which the transaction device may be used without generating an alert or otherwise violating user use conditions. In another embodiment, the time of day information may include information designating the times of day during which an alert shall be generated and transmitted if the transaction device is used. The time of day information is not limited to times within a single day, but may also include day of week information, or may expressly provide exact dates or any ranges thereof.

Any or all of the described user alert location data may be combined with or otherwise associated with other location alert data stored on the transaction device. For example, rules or conditions may incorporate both boundary and time of day information. In another example, rules or conditions may only apply to certain card users associated with the transaction device. Furthermore, the described user alert location data is provided for illustrative purposes, and any other information that may be helpful in defining rules, conditions, or otherwise facilitate generating an alert indicating the location of a device user may be applied. Moreover, location alert data may simply include guardian and/or cardholder contact information, or an absolute alert stored as an indicator without inclusion of additional alert rules or boundaries, which may cause an alert or notification to be generated any time the transaction device is presented.

According to another aspect, a contactless transaction device containing location alert data may be configured to allow one or more parties to enter, update, delete, or otherwise alter the location alert data stored thereon. The data entry and/or update transactions may be conducted at a typical transaction terminal, such as from a merchant point of sale device, from a personal computer in direct communication with the contactless transaction device or in communication with a data store over a network, such as the Internet, or telephonically, such as during live communication with a customer service agent or through an automated interactive voice response ("IVR") system.

Accordingly, a transaction device that includes consumer account data used to facilitate typical payment and other transactions, but also includes or is associated with user location alert data, allows for contacting, alerting, or otherwise notifying a device user's guardian or other party when the transaction device is presented for use.

FIG. 1 shows a schematic diagram of one example system 100 and an associated apparatus to facilitate locating a user of a transaction device when presented during a transaction, according to an example embodiment of the invention. The system 100 and/or apparatus may also be utilized to facilitate a consumer account based transaction, such as any conventional payment transaction, for example, a point of sale payment transaction at a merchant or retailer. The system 100 may include a transaction device 102, for example a contactless transaction device, used by a device user 114 (who may be referred to interchangeably as "cardholder," "user," and "device holder"), one or more point of sale ("POS") terminals 104 for facilitating a consumer account based transaction with the transaction device 102, each optionally in communication with one or more networks 106. The system 100 may further include one or more financial institutions 108, and one or more service providers 110, each also optionally in communication the network 106 for transacting with the POS terminals 104. In one example embodiment, the system 100 may further include one or more data update terminals 112 for entering and/or updating location alert data stored on or associated with the transaction device 102, also optionally in communication with the network 106 and/or the financial institutions and/or service providers 110. One or more guardians 116 may also be in communication with any of the systems, either directly or over the network 106. For example, a guardian 116 may receive location alert notifications from the POS terminal 104, the service provider 110, and/or the financial institution 108, via the network 106 via a telephone, cellular telephone, email, the Internet, an intranet, or other communication means. A guardian 116 may also directly interface with the data update terminal 112 when entering and/or updating location alert data stored on the transaction device 102 used by the device user 114.

The transaction device 102 may be any suitable device that may be utilized by a device user, such as device user 114, to facilitate any transaction, such as a payment transaction or a loyalty transaction. In one example embodiment, the transaction device 102 may be a typical payment card, such as a credit card, debit card, or stored value card. In one embodiment, the transaction device 102 may be a contactless transaction device that is RFID enabled and has location alert data stored thereon in addition to typical consumer account data. In other example embodiments, the transaction device 102 may be a non-traditional transaction device operable for use in a consumer transaction, such as a digital assistant, a personal digital assistant, a cellular phone, a mobile phone, a smart phone, or any other processor-based device, and/or configured in a non-traditional configuration, such as a key fob, a wristband, any other wearable article, and the like. Although any of the aforementioned example transaction devices 102, or any other suitable transaction devices, may be used and still within the scope of the appended claims, for simplicity a contactless transaction device configured as a RFID payment card storing consumer account data and location alert data will be referred to in the following description. It is further appreciated that a transaction device need not be a "contactless" transaction device, and may include the ability to communicate via wired, wireless, optical, and/or magnetic communications, such as a typical payment card having a magnetic strip and/or bar code with consumer account data and location alert data stored or coded thereon.

An example RFID enabled contactless transaction device 102 may include at least one integrated circuit microchip and at least one antenna or wireless transmitter and/or receiver, for transmitting and/or receiving information associated with a contactless transaction. The microchip and antenna may include circuitry operable to communicate electronic transaction details to a transaction terminal via a contactless reader or another RFID enabled communication device. The microchip includes a memory operable to store consumer account data, location alert data, and/or any other data. The microchip and memory may also be programmable and writeable such that the data stored thereon may be altered, for example, using a RFID enabled transaction terminal to update location alert data.

In example embodiments in which the transaction device 102 is a passive RFID contactless transaction device, other RFID enabled devices, including RFID transaction terminals, may provide power to or otherwise energize the microchip via the antenna by induction or via a separate induction loop. In one example embodiment, the antenna both receives signals from a contactless transaction device reader, which may also energize the microchip, and transmits signals from the microchip to a contactless transaction device reader. In other embodiments, however, a separate induction loop may be included with the antenna, to receive signals from a contactless transaction device reader and to energize the microchip.

For simplicity, "antenna" as used herein may refer to an antenna, an induction loop, and/or both an antenna and induction loop. In other embodiments, the transaction device 102 may be an active or semi-active contactless transaction device, including a battery or other power source, such as a solar cell, to power the microchip independent of signals received from a transaction terminal.

According to one example embodiment in which the transaction device 102 is a contactless transaction device, the microchip and antenna of the transaction device 102 may use any wireless communication methodology and may communicate with radio frequencies. Furthermore, in example embodiments, the information transmitted by the contactless transaction device 102 may conform to any suitable specifications for credit cards, such as PayPass®, Discover Zip®, Visa Contactless®, ExpressPay®, and the like. In example embodiments, the microchip and antenna may be designed to conform to International Organization for Standardization/International Electrotechnical Commission (ISO/IEC) standards for contactless transaction cards and proximity cards, including the ISO/IEC 14443 standard and/or the ISO/IEC 15693 standard, among others.

A transaction may be conducted by positioning the transaction device 102 a proximate distance from a contactless transaction terminal capable of transmitting and receiving a signal via the antenna to/from the microchip, such as the POS terminal 104 or the data update terminal 112. Example embodiments may also include having a contactless transaction terminal transmit a signal via the antenna to the microchip, such as a handshake signal, instructing the microchip to start transmitting data that can be used to process the transaction. In one example, the transaction device 102 may be a contactless transaction device conforming to the ISO/IEC 14443 standard, and a contactless transaction device reader may send and receive messages via the antenna to/from the microchip via a modulated radio frequency ("RF") field that has a carrier frequency of approximately 13.56 MHz. Accordingly, any of the transaction terminals described herein may be operable to communicate with a transaction device 102 following the same, similar, or otherwise conforming standards.

According to one aspect of the invention, consumer account data is stored on or otherwise associated with the transaction device 102. Consumer account data may be any data for use in association with or relating to a typical consumer transaction. Example consumer account data may include, but is not limited to, account numbers, account information, expiration dates, balances, limits, transaction histories, account holder name, billing address, shipping address, issuer information, and the like. In one embodiment, the transaction device 102 may store a unique identifier, such as an account number, which may refer to remotely stored consumer account data associated with the unique identifier. The remote consumer account data may be any of the above-referenced consumer account data, or any other additional account related data. The remotely stored consumer account data may be stored in one or more remote locations, such as a merchant or retailer system, a financial institution 108, which may include a bank, an issuer, and/or a third party payment processor.

Similarly, location alert data associated with the device user 114 may be stored on or otherwise associated with the transaction device 102. The location alert data may include, but is not limited to, cardholder information, cardholder contact information, guardian contact information, cardholder boundary information, time of day information, safe location information, an absolute alert, medical provider information, law enforcement officer, or service provider information. Much like the consumer account data, the transaction device 102 may only store one or more unique identifiers that refer to remotely stored location alert data associated with the unique identifier(s). According to one example embodiment, the remotely stored location alert data may be stored and/or maintained by one or more service providers 110 and/or one or more financial institutions 108, such as a card issuer, a bank, and/or a third party payment processor.

According to one embodiment, a transaction device 102 having location alert data stored thereon or otherwise associated therewith, may further include identifying indicia that indicates to a transaction terminal operator that a user location alert should be generated and/or transmitted. The indicia may be any written text, trademark, service mark, or other recognizable indicia. The indicia may also cause the terminal operator to operate one or more programs on the POS terminal 104 to request or otherwise read location alert data from the transaction device 102.

In example embodiments in which the transaction device 102 is a contactless transaction device, consumer account data and/or location alert data may be stored in the memory of the contactless transaction data. In other embodiments in which the transaction device 102 is not contactless, consumer account data and/or location alert data may be stored in a magnetic strip readable by a magnetic reader, or may be coded into a bar code readable by a bar code scanner. For transaction device 102 embodiments including magnetic strips and/or bar codes for storing data, some data may be associated by reference to one or more unique identifiers that refer to remotely stored data as described herein.

In yet other embodiments, the transaction device 102 may include account indicia displayed on the device, whether or not the transaction device 102 is contactless. For example, the account indicia may be an account number, a card number, or any other unique identifier, as described herein. The account indicia may be printed, embossed, or otherwise displayed on the transaction device. Accordingly, when a transaction device 102 is presented to a transaction terminal to conduct a transaction, the terminal operator may manually enter at least part of the account indicia at the transaction terminal, instead of or in addition to conducting a contactless inquiry, allowing for subsequent transactions or communication for remotely stored consumer account data and/or location alert data, as may be needed.

In one example embodiment, the transaction device 102 may be purchased without any location alert data stored thereon, and may be updatable by one or more guardians 116 or other users. For instance, a guardian 116 may update the location alert data at a retailer transaction terminal, from a personal computer, or from any other transaction terminal in communication with the transaction device 102. In another example embodiment, a guardian 116 may communicate location alert data to a service provider 110 or a financial institution 108 for entering and/or updating location alert data stored remotely and associated with the transaction device 102.

With reference again to FIG. 1, the POS terminal/device 104 may be any suitable transaction device for facilitating the collection of information from the transaction device 102, for example during processing of a typical payment transaction at a retailer or merchant. The POS terminal/device 104 may be any processor-driven device or plurality of devices operable to process a transaction at a point of sale, such as a personal computer, a mobile computer, a handheld portable computer, a digital assistant, a personal digital assistant, a cellular phone, a mobile phone, a smart phone, a pager, a digital tablet, a desktop computer, a laptop computer, an Internet appliance, or any other processor-based device. The POS terminal/device 104 may include at least one processor 120, a memory 122, and one or more input/output ("I/O") interface(s) 124. The memory 122 may store data files and various software program modules, such as a consumer transaction application 126 program for processing a typical consumer transaction, such as a payment or loyalty transaction, and a user location application 128 program for processing user location alert data, generating user location alerts, and/or transmitting user location alerts. The memory 122 may also include an operating system ("OS"), such as, but not limited to, Microsoft Windows®, Apple OSX™, or Linux, and a database management system ("DBMS") to facilitate management of data files and data stored in the memory 122, for example.

The consumer transaction application 126 may request, receive, process, and transmit information associated with a transaction, for example, information associated with the consumer account data stored on the transaction device 102 when presented as a payment instrument. The consumer transaction application 126 may additionally operate in conjunction with one or more of the I/O interfaces 124 to facilitate communication with one or more other components of the system 100, such as, one or more financial institutions 108, which may include a payment processors, an issuer, a bank, and the like, and/or with one or more third party data sources.

Similarly, the user location application 128 may request, receive, process, and transmit user location alert data, and may additionally operate in conjunction with one or more of the I/O interfaces 124 to facilitate communication with one or more other components of the system 100, such as, one or more service providers 110 or financial institutions 108. Moreover, the user location application 128 may facilitate generation and/or transmission of user location alerts to one or more guardians or other entities via communication means over one or more networks 106, such as telephone communication, cellular telephone message, Short Message Service ("SMS") message, email, Internet message, and the like. Accordingly, the user location application 128 includes instructions and logic operable to receive and analyze user location alert data received from a transaction device 102, to generate and/or transmit an appropriate message, including, but not limited to, a voice message script, automatically placing a call and leaving a message (e.g., using an IVR system), automatically generating and transmitting a SMS message, an email, or any other Internet-based message, and the like. In example embodiments, the user location application 128 includes instructions and logic operable to interface with the consumer transaction application 126, such that it causes the consumer transaction application to generate a transaction having a unique user alert type for regular transmission to a financial institution over a bank network or other private or public network.

The I/O interfaces 124 may include transaction device reader hardware for transmitting to and/or requesting information from the transaction device 102. Examples of device reader hardware may include, but are not limited to, RFID transceivers and/or other RFID communication devices, Bluetooth transceivers and/or other Bluetooth communication devices, infrared transceivers and/or other infrared communication devices, and/or NFC devices. In other example embodiments, the device reader hardware may include a magnetic strip reader and/or a bar code reader for reading information from transaction devices and/or products having data stored on a magnetic strip or coded in a bar code. The I/O interfaces 124 may also facilitate communication between the POS terminal 104 and one or more input/output devices, for example, a display, keyboard, keypad, mouse, control panel, touch screen display, microphone, and the like, that facilitate user interaction with the POS terminal 104. The one or more input/output devices may be utilized to collect information from any user of the POS terminal 104, for example, a retail agent or store clerk operating the terminal during a payment transaction, or the device user 114 providing a personalized identification number or other verification information. The I/O interfaces 124 may also facilitate connection of the POS terminal 104 to one or more suitable networks 106, for example, a local area network, a wide area network, the Internet, an intranet, a telephone network, a cellular network, and the like, such as may be used when communicating with one or more of the other entities or when transmitting a user location alert to one or more guardians 116. Additionally, other components may be included in the POS terminal 104 as desired in various embodiments of the invention.

The data update terminal 112 may be any suitable transaction device for entering and/or updating information on the transaction device 102, for example when entering or updating location alert data on a transaction device 102 by the guardian 116. The data update terminal 112 may be any processor-driven device or plurality of devices operable to receive user input and communicate with a transaction device 102, such as a personal computer, a mobile computer, a handheld portable computer, a digital assistant, a personal digital assistant, a cellular phone, a mobile phone, a smart phone, a pager, a digital tablet, a desktop computer, a laptop computer, an Internet appliance, or any other processor-based device. The data update terminal 112 may include at least one processor 130, a memory 132, and one or more input/output ("I/O") interface(s) 134. The memory 132 may store data files and various software program modules, such as a user location data entry application 136 program for receiving location alert data input from a guardian 116, and transmitting the location alert data input and/or updates to the transaction device 102. The memory 132 may also include an operating system ("OS"), such as, but not limited to, Microsoft Windows®, Apple OSX™, or Linux, and a database management system ("DBMS") to facilitate management of data files and data stored in the memory 132, for example. The user location data entry application 136 may receive user location data input from the guardian 116 (e.g., updates or additions to existing location alert data), and transmit the location alert data updates to the transaction device 102. In one example embodiment, the user location data entry application 136 may further include instructions for verifying the authority of a guardian 116 to access information on and/or transmit information to the transaction device 102. Authority may be determined using various techniques, such as such as a PIN, a password, a biometric indicator, voice verification, image verification, and the like. The user location data entry application 136 may additionally work in conjunction with one or more of the I/O interfaces 134 to facilitate communication with one or more other components of the system 100, such as, one or more service providers 110, which may store and manage user location data or other information remotely.

The I/O interfaces 134 may include transaction device reader hardware for transmitting to and/or requesting information from the transaction device 102. Examples of device reader hardware may include, but are not limited to, RFID transceivers and/or other RFID communication devices, Bluetooth transceivers and/or other Bluetooth communication devices, infrared transceivers and/or other infrared communication devices, and/or NFC devices. In other example embodiments, the device reader hardware may include a magnetic strip reader and/or a bar code reader for reading information from transaction devices and/or products having data stored on a magnetic strip or coded in a bar code. The I/O interfaces 134 may also facilitate communication between the data update terminal 112 and one or more input/output devices, for example, a display, keyboard, keypad, mouse, control panel, touch screen display, microphone, and the like, that facilitate user interaction with the data update terminal 112. The one or more input/output devices may be utilized to collect information from any user of the data update terminal 112, for example, a guardian 116 when entering location alert data for transmission to the transaction device 102. The I/O interfaces 134 may also facilitate connection of the data update terminal 112 to one or more suitable networks 106, for example, a local area network, a wide area network, the Internet, an intranet, a telephone network, a cellular network, and the like, such as when transmitting location alert data to a service provider 110 or a financial institution 108 for remote management and storage. Additionally, other components may be included in the data update terminal 112 as desired in various embodiments of the invention.

As mentioned, the system 100 may optionally include one or more financial institutions 108 that include any number of suitable processing systems and/or processing devices in communication with the POS terminals 104 over a network 106, to facilitate processing a consumer transaction, such as a payment, and optionally with the data update terminals 112 for updating remotely stored user location alert data. A financial institution 108 may be a third party payment processor, a bank, an issuer, or any combination thereof that may participate in processing a consumer transaction. The POS terminals 104 and the one or more financial institutions 108 may be in communication over a public network, such as the Internet or a telephone network, or a private network, such as a private bank network. In certain embodiments of the invention, the one or more financial institutions 108 include a consumer transaction processing application program 140 for processing any number of consumer transactions from the POS terminal 104, such as payment or loyalty transactions. The financial institution may also include one or more systems and/or devices that facilitate back-end processing of a transaction, such as one or more systems and/or devices that facilitate back-end processing of a transaction, such as one or more credit card processing systems, one or more debit card processing systems, one or more stored value card processing systems, one or more card issuers, and the like. Each of the one or more financial institutions 108 may include an appropriate processor driven device that facilitates processing of a transaction.

The financial institution system 108 may further include a user location application 142 and a user location database management system 144 in communication with a data store for remote storage and management of user alert location data. Thus, in embodiments including one or more financial institutions, the transaction device 102 may simply store a unique identifier, such as an account number, which may be used by the POS terminal 104 and/or the data update terminal 112 to request and/or update data stored by one or more service providers 110 and associated with the unique identifier(s). Furthermore, according to some embodiments, the financial institution 108 may execute the user location application 142 to process user alert location data to determine whether a user location alert should be generated and transmitted, and to generate and transmit a user location alert to one or more guardians 116, as further described herein.

The system 100 may also optionally include one or more service providers 110 that include any number of suitable processing systems and/or processing devices in communication with one or more of the POS terminals 104, and/or the data update terminals 112. In one example embodiment, the service provider system 110 may facilitate user location alert data information inquiry and/or update transactions. For example, the service provider system 110 may also include a user location application 150 and a user location database management system 152 in communication with a data store for remote storage and management of user alert location data, operating in a manner similar to that as described for the financial institution 108.

Generally, each of the memories 122, 132, the user location DBMS systems 144, 152, and any other data storage devices or databases, can store data and information for subsequent retrieval. In this manner, the system 100 can store various received or collected information in memory or a database associated with a POS terminal 104, a data update terminal 112, a service provider system 110, and/or a financial institution system 108. The memories 122, 132, the user location DBMS systems 144, 152, and any other data storage devices or databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments the user location DBMS systems 144, 152 and/or any other database shown can be integrated or distributed into any number of databases or data storage devices residing in association with one or more of the systems in the overall system 100.

Suitable processors for a POS terminal 104, a data update terminal 112, a service provider system 110, and/or a financial institution system 108 may include a microprocessor, an ASIC, and state machine, Example processors can be those provided by Intel Corporation (Santa Clara, Calif.), AMD Corporation (Sunnyvale, Calif.), and Motorola Corporation (Schaumburg, Ill.). Such processors include, or may be in communication with media, for example computer-readable media, which stores instructions that, when executed by the processor, cause the processor to perform the elements and/or functions described herein. Embodiments of computer-readable media include, but are not limited to, an electronic, optical, magnetic, or other storage or transmission device capable of providing a processor, such as processors 120, 130, or any other processors, for example those in used by the service provider systems 110 and/or the financial institution systems 108, with computer-readable instructions. Other examples of suitable media include, but are not limited to, a floppy disk, CD-ROM, DVD, magnetic disk, memory chip, ROM, RAM, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may include code from any computer-programming language, including, for example, C, C++, C#, Visual Basic, Java, Python, Perl, and JavaScript. Furthermore, any of the processors 120, 130, or any other processors, for example those in used by the service provider systems 110 and/or the financial institution systems 108, may operate any operating system capable of supporting a browser or browser-enabled application including, but not limited to, Microsoft Windows®, Apple OSX™, and Linux.

FIG. 2 shows an example data flow 200 between the components and entities shown associated with the system 100 to facilitate locating a user of a transaction device 102 in accordance with an example embodiment of the invention. As described according to one embodiment, a device user 114 may use a transaction device 102 to facilitate processing a consumer account transaction with a POS terminal 104, such as a payment at a retailer or merchant terminal. For example, when processing a payment transaction in which the device user 114 presents the transaction device 102 as a payment instrument, a POS terminal 104 and its consumer transaction application 126 may transmit 202 a request for consumer account data from the transaction device 102, such as an account number, expiration data, balance, limit, and the like. The request for consumer account data may be transmitted 202 by way of radio frequency communication when the transaction device 102 is in proximity to the POS terminal 104, energizing the microchip and causing consumer account transaction processing. In another embodiment, the request may be conducted by a magnetic strip reader or a bar code scanner, for example.

In response, the transaction device 102 may transmit 204 user location alert data stored in the memory of the transaction device 102. The user location alert data may be processed by the POS terminal 104 to determine whether a user location alert should be generated and/or transmitted. In one embodiment, the microchip of transaction device 102 processes the request from the POS terminal to determine whether a violation of user location alert data has occurred, prior to transmitting 204 some or all of the location alert data to the POS terminal for further processing. For example, the transaction device 102 may include programming that only transmits 204 location alert data in response to a POS request when one or more conditions or rules are violated. To analyze the location alert data rules or conditions, the microchip of the transaction device 102 may use information transmitted 202 from the POS terminal in its initial request 202 for consumer account information, for example information that may identify the retailer or merchant, indicate the location, and/or indicate the time of day, day of week, etc. However, in other example embodiments, the transaction device 102 may always transmit 204 user location alert data in response to the initial request 202 by the POS terminal 104 for consumer account information. Although the transaction device 102 is described as transmitting data, transmission steps may be more passive, such as when data is read from a magnetic strip or a bar code.

Upon receiving 204 the user location alert data from the transaction device 102, the POS terminal 104 may generate a user alert for transmission to one or more guardians 116. In one example, the POS terminal 104 may optionally perform additional processing of the user alert location data to determine whether a user alert should be generated and/or transmitted. For example, the user alert location application 128 may determine whether any of the rules or conditions associated with boundary conditions, safe location information, and/or time of day information have been violated. The POS terminal 104 and its user location application 128 may use information known or otherwise recognized by the terminal to analyze the location alert data, such as store or entity identifiers, time of day, day of week, address, and the like. In other embodiments, however, the POS terminal 104 may request additional information from third parties for use in the analysis of the user location alert data.

In one example, the transaction device 102 transmits a unique identifier, such as an account number, that is associated with remotely store location alert data, such as at a service provider 110 or a financial institution 108. Thus, in this example embodiment, the POS terminal may optionally transmit 210, 214 a request for additional remotely stored location alert data associated with the unique identifier to the service provider 110 or the financial institution 108, respectively. The service provider 110 or the financial institution 108 may query for the associated location alert data using one or more user location DBMS systems 152, 144, and transmit 212, 216 the associated location alert data to the POS terminal, respectively. In one example embodiment, the service provider 110 and/or the financial institution 108 perform processing by one or more user location applications 150, 142 on the location alert data associated with the unique identifier transmitted 210, 214 from the POS terminal, and only transmit 212, 216 location alert data associated with the unique identifier a determination is made that a user alert should be generated and/or transmitted. In another example, the service provider 110 or the financial institution 108 generate and transmit any user alerts to be generated, and thus do not transmit 212, 216 location alert data to the POS terminal 104.

Upon receiving complete location alert data, whether it be directly from the transaction device 102, and/or from a service provider 110 or financial institution 108, the POS terminal 104 may optionally perform any additional processing of the user alert data, and generate and transmit 206 a user alert to one or more guardians 116 identified by the location alert data. As described, in one example embodiment, the POS terminal 104 and its user location application 128 may determine if rules or conditions associated with the user location alert data are violated prior to generating and/or transmitting 206 a user location alert. In other embodiments, however, the POS terminal may generate and transmit 206 a user location alert any time location data is received from a transaction device 102, service provider 110, or financial institution 108 without performing additional processing to determine violations.

In one embodiment, the POS terminal 104 may transmit 206 the generated user location alert to one or more guardians 116 via one or more networks 106. For example, a terminal operator may place a live telephone call over a telephone network to a guardian 116 based on the location alert data received, notifying the guardian of the name of the device user 114 and the location of the POS terminal 104. In other examples, an automated message may be generated by the user location application 128 using an IVR system and transmitted over a telephone network, a SMS message may be generated and transmitted over a cellular network, or an email or other Internet notification may be transmitted over the Internet.

In another embodiment, the POS terminal 104 may transmit 220, 224 a user location alert via one or more networks 106 to a service provider 110 or a financial institution 108 for subsequent transmission 222, 226 by the service provider 110 or financial institution 108 to one or more guardians 116, respectively. In this example, the service provider 110 or financial institution 108 may perform additional processing on the user location alert (either based entirely on the user location alert or on data store locally by the entity) prior to transmitting 222, 226 the final user location alert to the one or more guardians 116. Though, in other embodiments, the service provider 110 or financial institution 108 may simply re-transmit 222, 226 the user alert to the one or more guardians 116 as received 220, 224 from the POS terminal 104.

As part of processing the transaction, in response to receiving 202 the request for consumer account data from the POS terminal 104, the transaction device 102 may transmit 230 some or all of the consumer account data stored in its memory to the POS terminal 104, for example an account number. As described herein, in one embodiment including a contactless transaction device having a microchip operable to process rules, the consumer account data may be transmitted 230 only upon determining by the microchip that rules or conditions represented by the location alert data are not violated. Though, in another embodiment, the consumer account data may be transmitted with any response to the POS terminal 104, such as when no location alert data processing is performed by the transaction device 102. Upon receiving 230 the consumer account data, the POS terminal 104 and its consumer transaction application 126 may perform payment transaction processing with a financial institution 108, as is known, such as with a payment processor, a card issuer, and/or a bank, for example.

According to one example embodiment, during a consumer account transaction the authority of a device user 114 to use the transaction device 102 as a payment instrument is verified. Thus, when conducting a consumer account transaction, the POS terminal 104 and its consumer transaction application 126 may request authorization information from the device user 114, such as a password, personal identification number, and the like.

With reference again to FIG. 2, in one embodiment in which the transaction device 102 is a contactless transaction device including a memory, the data stored on the transaction device 102, such as location alert data, may be updated by a data update terminal 112 and its user location data entry application 136. For example, after a guardian 116 (or in some cases a device user 114) purchases or otherwise activates a transaction device 102 operable to store location alert data thereon, the device user 114 may use a data update terminal 112, such as a transaction terminal in a retailer or a personal computer, to enter location alert data specific to the device user 114, such as, but not limited to, cardholder information, cardholder contact information, guardian contact information, cardholder boundary information, time of day information, safe location information, an absolute alert, medical provider information, law enforcement officer, or service provider information. Thus, after the guardian 116 (or any other user) inputs or otherwise enters data into the data update terminal 112, the data update terminal 112 transmits 250 the entered or updated location alert data to the transaction device 102. Though not illustrated, the transaction device 102 may respond with a status message (e.g., success/failure).

In one example embodiment in which the transaction device 102 stores only an identifier associated with remotely stored location alert data, upon the entry by a guardian 116 of location alert data into the data update terminal 112, the data update terminal 112 and its user location data entry application 136 transmit 252 a request for the unique identifier stored on the transaction device 102, such as an account number. In response, the transaction device 102 transmits 254 a unique identifier to the data update terminal 112. The data update terminal 112 and its user location data entry application 136 then transmit 256 the unique identifier with the updated location alert data to the service provider 110 via a network 106, enabling the service provider 110 to update the location alert data associated with the unique identifier, such as by using the user location DBMS 152 to update one or more data stores. Upon updating the location alert data, the service provider 110 may then respond 258 via the network 106 to the data update terminal 112 with a status message (e.g., success/failure).

According to one example embodiment, the authority of a guardian 116 (or any other user's authority) to enter and/or update location alert data stored on or associated with the transaction device 102 may be verified. Thus, when performing a location alert data update transaction, the data update terminal 112 and its user location data entry application 136 may request authorization information from the guardian 116, such as a password, personal identification number, and the like. In one embodiment, upon entry of the authorization information, the data update terminal 112 may transmit 260 the authorization information to the transaction device 102 for verification. A response (e.g., yes/no, 0/1, valid/invalid, etc.) may then be transmitted 262 from the transaction device 102 to the data update terminal 112. However, in another embodiment, the data update terminal 112 may transmit authorization information, such as a password or personal identification number, when transmitting 250 the updated medical data during the original transmission. In another embodiment, the data update terminal 112 may request authorization information from the transaction device 102 to perform the verification by the user location data entry application 136. In yet another embodiment, the data update terminal 112 may transmit the authorization information requested from the guardian 116 and a unique identifier to the service provider 110 via a network 106, and receive an authorization response (e.g., yes/no, 0/1, valid/invalid, etc.) from the service provider 110.

With each of the various transactions illustrated by the data flow 200, access to certain information (e.g., access to location alert data versus consumer account data) stored on or associated with the transaction device 102 may be limited or restricted. For example, when a guardian 116 or other user is entering or updating location alert data from a data update terminal 112, access to view and/or update consumer account data may be limited or restricted.

In example embodiments, some or all of the data transmitted between entities in the system, as described by the systems 100 and the data flow 200 illustrated in FIGS. 1 and 2, may be encrypted to increase security and maintain privacy of the information. The security of financial account information is paramount to avoid fraud, particularly when performing electronic payment transactions. As described, certain data may be password protected, the systems may include administrative functions that include unique user identification for any person and/or entity operating and/or accessing the systems, that vary access to certain data based on user roles and responsibilities, and that can terminate user access to one or more of the systems. Additionally, the consumer transaction application 126, the user location applications 128, 150, 142, the user location data entry application 132, the consumer transaction processing application 140, and/or any other data transmission/communication systems, as described herein that may be executed by one or more of the above described entities to transmit or receive consumer account data and/or location alert data, may include an encryption/decryption module and/or an user access administration module to satisfy the security and privacy of financial account information and/or user information.

One skilled in the art may recognize the applicability of embodiments of the invention to other environments, contexts, and applications. One will appreciate that components of the system 100 and data flow 200 shown in and described with respect to FIGS. 1 and 2 are provided by way of example only. Numerous other operating environments, system architectures, device configurations, and data flows are possible. Accordingly, embodiments of the invention should not be construed as being limited to any particular operating environment, system architecture, device configuration, or data flow.

Embodiments of a system, such as 100, an associated apparatus, and data flow, such as 200, can facilitate locating a user of a transaction device. Locating a user of a transaction device and/or notifying another party when the transaction device is presented for completing a transaction can be achieved by way of implementation of various embodiments of the system 100, associated apparatus, data flow 200, and methods described herein. Example methods and processes which can be implemented with the example system 100, associated apparatus, and data flow 200, as well as other system, apparatus, and data flow embodiments, are described by reference to FIGS. 3-6.

FIG. 3 is a flowchart of one example method 300 to facilitate locating a user of a transaction device 102 in accordance with various embodiments of the invention. The method 300 may include receiving location alert data that facilitates alerting or otherwise notifying one or more guardians of the device user when a transaction device 102 is presented during processing a transaction, such as a typical payment transaction at a retailer or merchant. These transaction devices having user location alert data stored thereon or associated therewith may be provided to persons who may have a need to be monitored or are otherwise prone to wandering, such as elderly persons, persons suffering from dementia, mental instabilities, mental disabilities, and the like, and/or convicted criminals subject to geographical boundary constraints, such as may result from parole or probation.

The method 300 may begin at block 305. At block 305, a transaction terminal, such as a POS terminal 104 as described with reference to FIGS. 1 and 2, may request, read, or otherwise obtain consumer account data from a transaction device 102 during typical transaction processing, such as a payment transaction using the transaction device 102. The transaction device 102, which may include a memory, a magnetic strip, a bar code, or other data storage means operable to store both consumer account data and location alert data, is possessed by a device holder 114 whose location is being monitored.

According to one example embodiment, a microchip on the transaction device 102 may perform initial processing of the location alert data stored in memory in response to the request at block 305 to make an initial determination as to whether location alert data or consumer account data should be transmitted at block 305. For example, a contactless transaction device may only transmit location alert data if one or more of boundary information, safe location information, and/or time of day information is violated, and otherwise transmit consumer account data used for normal processing of the transaction.

Following block 305 is block 310, in which the transaction terminal, the POS terminal 104 in this example, receives location alert data from the transaction device 102 in response to the request for consumer account data at block 305. As is described in more detail herein, the location alert data may include substantive data elements, a unique identifier to remotely stored location alert data, or a combination thereof. Furthermore, the transaction device 102 may respond with consumer account data in addition to the location alert data.

According to one example embodiment, the transaction terminal may perform processing on the received location alert data to determine whether a user location alert should be generated and transmitted. For example, if the location alert data includes boundary information, safe location information, and/or time of day information, the transaction terminal may determine whether those conditions are violated by the transaction. According to another example embodiment, a remote location, such as a service provider 110 or a financial institution 108, may perform some or all of the location alert data processing to determine whether an alert should be generated and transmitted.

Following block 310 is block 315, in which a user location alert is generated and transmitted to one or more guardians 116. Different user location alerts may include, but are not limited to, live telephone call, IVR messaging, SMS messaging, email, Internet alert, and the like. As is described, the transaction terminal, such as the POS terminal 104, a service provider, such as the service provider 110, and/or a financial institution, such as the financial institution 108, may generate the user location alert and/or transmit the alert to the one or more guardians.

The method 300 may end after block 315, having alerted one or more parties of the device user's 114 location if necessary.

FIG. 4 is a flowchart of one example method 400 to facilitate locating a user of a transaction device 102 in accordance with various embodiments of the invention. The method 400 may include receiving location alert data that facilitates alerting or otherwise notifying one or more guardians of the device user when a transaction device 102 is presented during processing a transaction, such as a typical payment transaction at a retailer or merchant. In this example, some or all of the location alert data stored on or associated with the transaction device 102 may be transmitted to a service provider and/or a financial institution to optionally perform additional processing and to generate and/or transmit a user location alert if necessary.

The method 400 may begin at block 405. At block 405, a transaction terminal, such as a POS terminal 104 as described with reference to FIGS. 1 and 2, may request consumer account data from a transaction device 102 during typical transaction processing, such as a payment transaction using the transaction device 102. The transaction device 102, which may include a memory, a magnetic strip, a bar code, or other data storage means operable to store both consumer account data and location alert data, is possessed by a device holder 114 whose location is being monitored.

Following block 405 is block 410, in which the transaction terminal, the POS terminal 104 in this example, receives, reads, or otherwise obtains location alert data from the transaction device 102 in response to the request for consumer account data at block 405. The location alert data may include a unique identifier, such as an account number, associated with remotely stored location alert data, causing the transaction terminal to provide the unique identifier to the remote entity for processing and resolution of the location alert data. In one example the remote entity may be a service provider, such as the service provider 110 as described with reference to FIGS. 1 and 2, or a financial institution, such as the financial institution 108, as described with reference to FIGS. 1 and 2.

Accordingly, following block 410 is block 415, in which the transaction terminal transmits the user location alert data in the form of a unique identifier to the service provider or the financial institution for retrieval of, processing of, and resolution of the remotely stored location alert data. The transaction terminal may also transmit with the user location alert data additional information, such as information identifying the terminal, the store, the address, the local time of day, and the like, which may be used in processing and analyzing the location alert data, such as boundary conditions, safe location information, and/or time of day information. This information may be automatically generated by the transaction terminal or manually input by the terminal operator.

In another embodiment, the transaction device 102 may store a unique identifier and substantive location alert data. In this embodiment, a transaction terminal may transmit both the unique identifier and the location alert data to a service provider or financial institution for processing. However, a transaction terminal may receive enough substantive location alert data that it may determine that a user location alert need not be generated, and not proceed with transmitting the unique alert identifier or the other location alert data. Furthermore, in one example embodiment in which the transaction terminal transmits substantive location alert data to a service provider or financial institution, the service provider or financial institution may optionally perform any processing, generation, and transmission based on the transmitted location alert data without retrieving data stored in its database or data store.

In one example embodiment, the transaction terminal may transmit the unique identifier of the location alert data (and any other accompanying information) as a typical payment transaction message as would be transmitted to a financial institution during an actual payment transaction; however, the message may have a transaction type indicator that indicates the transaction is a user location alert type rather than a payment transaction. In this embodiment, the new transaction type message may be transmitted over a private network, such as a bank network, in a manner similar to processing a typical payment transaction between the terminal and the financial institution. For example, a bank, an issuer, and/or a payment processor may be operable to receive a user location alert transaction over the existing bank network, identify that it is a user location payment transaction based on a transaction type indicator, or in some embodiments, a new banking identification number, account number, account scheme, or routing number, for example. In other embodiments, a service provider may also be in communication with the private bank network and configured to receive a user alert transaction in a manner similar to receiving a payment transaction.

Following block 415 is block 420, in which the service provider or the financial institution (or any other remote entity) may retrieve the remotely stored location alert data and optionally determine if a user location alert should be generated and/or transmitted. In one example, a service provider may retrieve the remotely stored location data from a database or data store based on the unique identifier transmitted from the transaction terminal. Upon retrieving the location alert data, the financial institution may optionally process the location alert data, for example if the location alert data includes boundary conditions, safe location information, and/or time of day information to determine if a user alert should be generated and/or transmitted to one or more guardians 116.

In one example, at block 420, the service provider or financial institution does not perform any additional processing or analysis of rules or conditions associated with the location alert data prior to generating and transmitting a location alert. For example, if there are no rules or conditions, such as boundary conditions; safe location information, and/or time of day information, or if there is an absolute alert indicator signifying that an alert should always be generated, the service provider or financial institution may always generate and transmit an alert based on the information contained in the location alert data. Or, in another example, if the service provider or financial institution does not have sufficient information to analyze the location alert data, such as no additional information identifying the transaction terminal, the retailer or merchant, the address, the time of day, and the like, a default action may be to generate and transmit a user location alert.

Following block 420 is block 425, in which the service provider or financial institution generates a user alert for transmission to one or more guardians 116. The user location alert may be based at least in part on the remotely stored location alert data associated with the unique identifier transmitted at block 415, any additional information transmitted from the transaction terminal, such as information identifying transaction terminal, the retailer or merchant, the address, the time of day, and the like, and any other information the service provider or the financial institution may have access to. In one example, the location alert data includes one or more predefined message texts, which may or may not be altered based upon the additional processing or analysis of the location alert data. In another example, the service provider or the financial institution may have software programming, such as the user location application 150, 142 and/or the user location DBMS systems 152, 144, that allow messages to be dynamically generated to include information material to the device holder's location. In other examples, predefined messages may be altered and/or dynamically generated in a similar manner.

Following block 425 is block 430, in which user location alert is transmitted to one or more guardians 116. Example, user location alerts may by one or more of a live telephone call, IVR messaging, SMS messaging, an email, a facsimile, a paging message, Internet alert, and the like.

In one example embodiment, after transmitting the user location alert to one or more guardians 116, the service provider or the financial institution may transmit a status message to the transaction terminal, indicating whether a message has been successfully sent (e.g., yes/no, 0/1, success/failure, etc.). In another example, the service provider or the financial institution may transmit the user location alert to the originating transaction terminal for the terminal to send the alert to one or more guardians 116.

The method 400 may end after block 430, having alerted one or more parties of the location of the device user 114 if necessary.

FIG. 5 is a flowchart of one example method 500 to facilitate locating a user of a transaction device 102 in accordance with various embodiments of the invention. The method 500 may include receiving location alert data that facilitates alerting or otherwise notifying one or more guardians of the device user when a transaction device 102 is presented during processing a transaction, such as a typical payment transaction at a retailer or merchant. In this example, a transaction terminal processing the transaction may process or perform analysis on the location alert data received from the transaction device 102 to determine whether an alert should be generated and a guardian notified.

The method 500 may begin at block 505. At block 505, transaction terminal, such as a POS terminal 104 as described with reference to FIGS. 1 and 2, may request consumer account data from a transaction device 102 during typical transaction processing, such as a payment transaction using the transaction device 102. The transaction device 102, which may include a memory, a magnetic strip, a bar code, or other data storage means operable to store both consumer account data and location alert data, is possessed by a device holder 114 whose location is being monitored.

Following block 505 is block 510, in which the transaction terminal, the POS terminal 104 in this example, receives location alert data from the transaction device 102 in response to the request for consumer account data at block 505.

Following block 510 is block 515, in which the transaction terminal receives consumer account data from the transaction device 102 to be used in processing the transaction, such as a payment transaction. The consumer account data may be transmitted from the transaction device 102 with the location alert data or in a separate message. Although the example method 500 illustrates the consumer account data being transmitted from the transaction device 102 at block 515 prior to determining if location alert data rules or conditions are violated (e.g., at block 520), in other embodiments, the consumer account data may be transmitted from the transaction device 102 after it is determined by the transaction terminal that no location alert data rules or conditions are violated.

Following block 515 is decision block 520, in which it is determined by the transaction terminal whether one or more of the user location alert data rules or conditions are violated by the device holder's 114 use of the transaction device 102. The transaction terminal may analyze the received user location data to determine whether rules or conditions are included. If there are rules or conditions, the transaction terminal may analyze those rules or conditions in light of the current transaction conditions using software programming, such as the user location application 128 of the POS transaction terminal 104.

For example, if the user location alert data includes boundary information, the transaction terminal may compare the terminal's known location, which may be stored in a memory in the terminal, to the conditions indicated by the boundary information. In one embodiment, the user alert rules or conditions may indicate boundary information that designates geographical limitations placed on the device user 114, such as, but not limited to, geographical areas or locations as described above. Accordingly, the transaction terminal may process the boundary information against what is known about the terminal location to determine whether a violation occurs.

Similar to boundary information, if the user location alert data includes safe location information, the transaction terminal may compare the information associated with the terminal to the conditions indicated by the safe location information. In one example embodiment, safe location information may include the information identifying locations, such as retailer or merchant names, at which if the contactless transaction device is used an alert may not be generated because the location has been pre-designated as indicating an acceptable location for card use. In another embodiment, the safe location information may expressly indicate locations at which if the contactless transaction device is used an alert would be generated because the location has been pre-designated as indicating a forbidden or otherwise alarming location for the user. Accordingly, the transaction terminal may process the safe location information against what is known about the terminal, such as the retailer or merchant name, to determine whether the device user 114 is in violation.

If the user location data includes time of day information, the transaction terminal may compare the approximate time of the transaction requested by the device user 114 to the conditions indicated by the time of day information. In one example embodiment, time of day information may include information designating times of day during which the contactless transaction device may be used without generating an alert or otherwise violating user use conditions. In another embodiment, the time of day information may include information designating the times of day during which an alert shall be generated and transmitted if the contactless transaction device is used. The time of day information is not limited to times within a single day, but may also include day of week information, or may expressly provide exact dates or any ranges thereof.

Accordingly, at decision block 520, the programming in or associated with the transaction terminal may provide for instructions to read the user location data rules or conditions, retrieve information known or otherwise recognized by the terminal, such as geographical information, entity information, and/or time and date information, and perform one or more comparisons between the two when determining a violation. The logical comparisons may be any comparison as may be typically performed, such as Boolean logical comparisons, string comparisons, and the like, as may be programmed and executed by a general purpose computer and programmed instructions.

Moreover, a same or similar processing and analysis technique may be executed by one or more service providers and/or financial institutions in embodiments in which location alert data is transmitted to a remote entity for processing.

If it is determined at decision block 520 that at least one of the location alert data rules or conditions are violated, or alternatively if an absolute alert is included in the location alert data indicating to always generate and transmit a user location alert, block 525 follows in which a user location alert is generated by the transaction terminal for transmission to one or more guardians 116, as described in more detail herein. As is also described herein, the transaction terminal, or a service provider or financial institution may generate the user location alert.

Following block 525 is block 530, in which the transmission terminal transmits the user location alert generated at block 525 to one or more guardians 116 in any manner as described herein. For example, the transaction terminal may transmit the user location alert directly to the guardian 116, or may transmit the user location alert to a service provider or a financial institution for transmission.

If it is determined at decision block 520 that no location alert data rules or conditions are violated, block 530 follows in which the transaction terminal continues to process the consumer transaction without generating or transmitting a user location alert.

The method 500 may end after block 530, having alerted one or more parties of the location of the device user 114 if necessary, or after block 535, having processed the consumer transaction without alerting a guardian of the location of the device user 114.

FIG. 6 is a flowchart of one example method 600 for using a transaction terminal to enter and/or update location alert data stored on a transaction device 102, such as a contactless transaction device having a memory and a microchip, in accordance with various embodiments of the invention. A transaction device 102 storing location alert data may be updateable to allow a device user to enter, update, customize, change, add, or otherwise alter location alert information stored thereon, such as after receiving a new contactless transaction device or when use limitations of a device user 114 change.

The method 600 may begin at block 605, in which an operator, such as a guardian 116, a device user 114, or a terminal operator, enters or updates location alert data into a transaction terminal for storing in a memory of a transaction device 102. The transaction terminal may be any typical transaction terminal operable to receive and wirelessly transmit device user input, such as the data update terminal 112 and its user location data entry application 136 described with reference to FIGS. 1 and 2. The location data update terminal 112 may be, but is not limited to, a personal computer, a mobile computer, a handheld portable computer, a digital assistant, a personal digital assistant, a cellular phone, a mobile phone, a smart phone, a pager, a digital tablet, a desktop computer, a laptop computer, an Internet appliance, a merchant or retailer POS terminal, or any other processor-based device. In another example embodiment, the transaction terminal may be operable to receive updated data input, and to communicate the input via a network to a service provider for storage and/or updating, such as the service provider 110 described with reference to FIGS. 1 and 2.

At block 605, the operator may enter new or additional location alert data to be stored on the transaction device 102, update location alert data already stored on the transaction device 102, and/or delete location alert data already stored on the transaction device 102. For example, the cardholder's contact information, guardian contact information, boundary information, safe location information, and/or time of day information may be entered or updated.

In one example embodiment, the data update terminal 112 and its user location data entry application 136 may initially read location alert data already stored on the transaction device 102 and present it to the terminal operator via a user interface at block 605. Thus, the operator may be able to view data already existing on the transaction device 102 and enter, update, or otherwise alter accordingly via the user location data entry application 136.

Following block 605 is block 610, in which the transaction terminal transmits to the transaction device 102 the location alert data from the entered by the operator at block 605. In an example embodiment in which the transaction device 102 is RFID enabled, placing the transaction device 102 in proximity to the transaction terminal and activating a radio frequency request by the terminal may energize the microchip of the transaction device 102 and cause it to receive the location alert data and begin processing the update request. In other embodiments, other techniques of wirelessly communicating with the transaction device 102 may be used. In yet other embodiments, the data may be read from a magnetic strip or a bar code on a transaction device, for example if the transaction device is not RFID enabled.

Following block 610 is decision block 615, in which the operator's authority to transmit location alert data to the transaction device 102 is verified by the transaction device 102 and/or the transaction terminal. In one example embodiment, the authority of the operator entering the information may be verified, such as by requesting and verifying a personal identification number, a password, and the like. Verifying the authority of the operator may be performed by the transaction terminal, by the transaction device 102, by a combination of both, and/or may be performed in association with authorization requests transmitted to a third party, such as a service provider 110 as described with reference to FIGS. 1 and 2.

If it is determined that the operator is authorized to transmit location alert data to the transaction device 102 at decision block 615, block 620 follows, in which the transaction device 102 may store the location alert data in its memory. New location alert data may be added to any existing location alert data, and existing location alert data may be altered, such as updated or deleted. The location alert data entry application 136 of a data update terminal 112 may perform the read, write, delete, and/or update processing at block 620.

Conversely, if it is determined that the operator is not authorized to transmit location alert data to the transaction device 102 at decision block 615, block 625 follows, in which the location alert data is not stored in memory of the transaction device 102. In one example embodiment, the user location data entry application 136 of the data update terminal 112 may display a status reject message, indicating to the operator that the authority verification failed, which may in turn prompt the operator to re-enter authorization information, re-transmit information to the device, and the like.

In one example embodiment, the transaction terminal may verify the operator's authority prior to transmitting location alert data to the contactless transaction device, which would cause decision block 615 and resulting blocks 620 and 625 to occur prior to block 610.

The method 600 may end after blocks 620 or 625, after location alert data is entered or updated on the contactless transaction device if the operator is authorized.

The operations described and shown in the methods of FIGS. 3-6 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3-6 may be performed.

The invention is described above with reference to block diagrams and flowchart illustrations of systems, methods, apparatuses and computer program products according to embodiments of the invention. It will be understood that each block of the block diagrams, and combinations of blocks in the block diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functionality of each block of the block diagrams, or combinations of blocks in the block diagrams discussed in detail in the descriptions above.

These computer program instructions may also be stored in a computer readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

Accordingly, blocks of the block diagrams and flowchart illustrations support combinations of means for performing the specified functions, combinations of elements or steps for performing the specified functions and program instruction means for performing the specified functions. It will also be understood that each block of the block diagrams, and combinations of blocks in the block diagrams, can be implemented by special purpose hardware-based computer systems that perform the specified functions, elements or steps, or combinations of special purpose hardware and computer instructions.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are The claimed invention is:

1. A contactless transaction device comprising:
an antenna operable to electromagnetically receive and transmit data; and
a microchip comprising a memory operable to store consumer account data and location alert data and in communication with the antenna, wherein the microchip is operable to:
(i) receive, from a guardian operating a data update terminal, location alert data,
(ii) transmit the location alert data to a transaction terminal via the antenna when the contactless transaction device is presented by a user, other than the guardian, to facilitate a transaction with the transaction terminal,
(iii) determine based at least in part on the location alert data whether restrictive criteria set by the guardian and associated with at least one of a boundary condition, safe location, or time of day has been violated,
(iv) if the restrictive criteria is violated, transmit based at least in part on the determination the location alert data and not the consumer account data, and
(v) if the restrictive criteria is not violated, transmit, based at least in part on the determination, the consumer account data to the transaction terminal via the antenna;
(vi) wherein the location alert data indicates to the transaction terminal to transmit an alert to the guardian indicating the location of the user of the contactless transaction device.

2. The contactless transaction device of claim 1, wherein the location alert data indicates to the transaction terminal to transmit the location of the user of the contactless transaction device.

3. The contactless transaction device of claim 1, wherein the location alert data comprises at least one of: cardholder information, cardholder contact information, guardian contact information, cardholder boundary information, time of day information, safe location information, an absolute alert indicator, medical provider information, law enforcement officer information, or service provider information.

4. The contactless transaction device of claim 1, wherein the microchip is operable to receive updated location alert data via the antenna.

5. The contactless transaction device of claim 1, wherein the microchip is further operable to transmit the consumer account data responsive to a request from the transaction terminal.

6. The contactless transaction device of claim 1, further comprising account indicia displayed on the transaction device, wherein the account indicia is associated with at least one of the consumer account data or the location alert data.

7. A method for locating a transaction device user, comprising:
requesting, by a transaction terminal comprising one or more computers, consumer account data from a transaction device when the transaction device is presented to facilitate a transaction with the transaction terminal, wherein the transaction device is operable to store consumer account data and location alert data, the location alert data received from a guardian operating a data update terminal;
receiving the location alert data at the transaction terminal from the transaction device presented by a user other than the guardian;
determine based at least in part on the location alert data whether restrictive criteria set by the guardian and associated with at least one of a boundary condition, safe location, or time of day has been violated;
if the restrictive criteria is violated,
transmitting the location alert data and not the consumer account data;
generating a user location alert, responsive to receiving the location alert data; and
transmitting the user location alert to the guardian;
if the restrictive criteria is not violated,
requesting, by the transaction terminal from the transaction device based at least in part on the determination, the consumer account data; and
facilitating the transaction based at least in part on the consumer data.

8. The method of claim 7, wherein the location alert data comprises at least one of: cardholder information, cardholder contact information, guardian contact information, cardholder boundary information, time of day information, an absolute alert indicator, safe location information, medical provider information, law enforcement officer information, or service provider information.

9. The method of claim 7, wherein the transaction device comprises account indicia displayed thereon, wherein the account indicia is associated with at least one of the consumer account data or the location alert data, and further comprising entering at least part of the account indicia at the transaction terminal.

10. The method of claim 7, wherein the user location alert generated by the transaction terminal comprises information indicating the transaction terminal location, and further comprising transmitting the user location alert to at least one of: a guardian of the transaction device cardholder, a medical provider, a law enforcement officer, or a service provider.

11. The method of claim 7, wherein the location alert data comprises cardholder information and at least one of guardian contact information, medical provider information, law enforcement officer information, or service provider, and wherein the user location alert generated by the transaction terminal comprises instructions to an operator of the transaction terminal to contact at least one of the guardian, the medical provider, the law enforcement officer, or the service provider.

12. The method of claim 7, further comprising transmitting the user location alert from the transaction terminal over a network to at least one of a service provider or a financial institution.

13. The method of claim 12, wherein the user location alert is transmitted as a new transaction type.

14. The method of claim 12, wherein the network comprises a bank network.

15. The method of claim 12, wherein the user location alert comprises information to enable the service provider or the financial institution to contact a guardian of the transaction device cardholder.

16. The method of claim 12, wherein the user location alert comprises information to enable the service provider or the financial institution to determine if a notification of the location of the user of the transaction device should be generated.

17. The method of claim 7, further comprising transmitting a transaction request from the transaction terminal to a financial institution or a service provider over a bank network, responsive to receiving the location alert data, wherein the transaction request comprises a bank identification number indicating that the transaction comprises a user location alert transaction.

18. The method of claim 7, wherein the transaction device comprises a contactless transaction device comprising an antenna, and a microchip comprising a memory operable to store the consumer account data and the location alert data and in communication with the antenna; and wherein receiving the location alert data at the transaction terminal comprises receiving the location alert data from the microchip via the antenna.

19. A system, comprising:
a memory comprising instructions;
a processor in communication with the memory, and operable to execute the instructions to:
receive, from a transaction terminal via a network, a user location alert, wherein the user location alert is generated by the transaction terminal responsive to receiving location alert data from a transaction device, the location alert data received from a guardian, and evaluating the location alert data from the transaction device when the transaction device is presented by a user other than the guardian to facilitate a transaction with the transaction terminal;
determine based at least in part on the location alert data whether restrictive criteria set by the guardian and associated with at least one of a boundary condition, safe location, or time of day has been violated;
if the restrictive criteria is violated,
transmit the location alert data and not the consumer account data;
generate a user location alert, responsive to receiving the location alert data; and
transmit the user location alert to the guardian; and
if the restrictive criteria is not violated,
request, based at least in part the determination, consumer account data; and
facilitate the transaction based at least in part on the consumer data.

20. The system of claim 19, wherein the processor is further operable to execute the instructions to transmit the message by at least one of: email, an internet message, short messaging service messaging, or telephonically.

21. The system of claim 19, wherein the network comprises a bank network.

22. The system of claim 19, wherein the processor is further operable to execute the instructions to determine that the user of the transaction device is violating at least one rule prior to generating the alert indicating the location of the user.

23. The system of claim 22, wherein the at least one rule comprises at least one of: cardholder boundary information, time of day information, safe location information, or an absolute alert indicator.

24. The system of claim 19, wherein the system for locating the transaction device user is associated with a third party service provider in communication with the transaction terminal over a network.

* * * * *